United States Patent
Lee et al.

(10) Patent No.: US 11,028,876 B2
(45) Date of Patent: Jun. 8, 2021

(54) SLIDE UNIT

(71) Applicant: SEGOS CO., LTD., Incheon (KR)

(72) Inventors: Doo Myun Lee, Incheon (KR); Sung Joon Kang, Incheon (KR); Duc Hoi Kim, Incheon (KR); In Suk Ra, Gyeonggi-do (KR); Jung Kyu Lim, Incheon (KR); Sung Woo Kim, Incheon (KR); Jae Hyuk Lim, Gyeonggi-do (KR)

(73) Assignee: SEGOS CO., LTD., Incheon (KR)

( * ) Notice: Subject to any disclaimer, the term of this patent is extended or adjusted under 35 U.S.C. 154(b) by 0 days.

(21) Appl. No.: 16/621,895

(22) PCT Filed: Nov. 23, 2018

(86) PCT No.: PCT/KR2018/014528
§ 371 (c)(1),
(2) Date: Dec. 12, 2019

(87) PCT Pub. No.: WO2019/107839
PCT Pub. Date: Jun. 6, 2019

(65) Prior Publication Data
US 2020/0116201 A1 Apr. 16, 2020

(30) Foreign Application Priority Data
Nov. 28, 2017 (KR) .......................... 10-2017-0160144

(51) Int. Cl.
*F16C 29/02* (2006.01)
*F16C 29/04* (2006.01)
(Continued)

(52) U.S. Cl.
CPC ............ *F16C 29/02* (2013.01); *A47B 88/487* (2017.01); *F16C 29/005* (2013.01);
(Continued)

(58) Field of Classification Search
CPC ........ F16C 29/005; F16C 29/02; F16C 29/04; F16C 29/048; F16C 33/32; F16C 2314/72;
(Continued)

(56) References Cited

U.S. PATENT DOCUMENTS

| | | | | |
|---|---|---|---|---|
| 4,752,142 A | * | 6/1988 | Jackson | A47B 88/487 384/18 |
| 2008/0157643 A1 | * | 7/2008 | Chen | A47B 88/47 312/334.6 |

(Continued)

FOREIGN PATENT DOCUMENTS

| | | | | |
|---|---|---|---|---|
| CN | 102170809 A | * | 8/2011 | ........... A47B 88/487 |
| CN | 105508422 A | * | 4/2016 | ........... A47B 88/493 |

(Continued)

OTHER PUBLICATIONS

International Search Report for PCT/KR2018/014528 dated Mar. 8, 2019.

*Primary Examiner* — Marcus Charles
(74) *Attorney, Agent, or Firm* — The PL Law Group, PLLC

(57) ABSTRACT

A slide unit includes a fixed rail fixed to a main body, and provided with a first accommodation space, a movable rail connected to a drawer body to allow the drawer body to be pulled out from and pushed into the main body, provided with a second accommodation space, and configured to be movable with respect to the fixed rail, an inner rail configured such that a first end thereof is inserted in the first accommodation space and a second end thereof is inserted in the second accommodation space, so as to allow the movable rail to be slidable with respect to the fixed rail, and a plurality of slide balls inserted in the first accommodation space to be disposed between the fixed rail and the inner rail, (Continued)

and inserted in the second accommodation space to be disposed between the movable rail and the inner rail.

17 Claims, 18 Drawing Sheets

(51) Int. Cl.
  *F16C 33/32*     (2006.01)
  *A47B 88/48*     (2017.01)
  *A47B 88/487*     (2017.01)
  *F16C 29/00*     (2006.01)

(52) U.S. Cl.
  CPC ............ *F16C 29/048* (2013.01); *F16C 33/32* (2013.01); *A47B 2210/0032* (2013.01); *A47B 2210/0035* (2013.01); *A47B 2210/0051* (2013.01)

(58) Field of Classification Search
  CPC ....... A47B 88/00; A47B 88/40; A47B 88/483; A47B 88/493; A47B 2210/0032; A47B 2210/0035; A47B 2210/0051; A47B 2210/0059
  USPC ....... 384/12, 18, 23, 49; 312/334.11, 334.21
  See application file for complete search history.

(56) References Cited

U.S. PATENT DOCUMENTS

| | | | | |
|---|---|---|---|---|
| 2011/0241515 | A1* | 10/2011 | Park | F24C 15/168 |
| | | | | 312/408 |
| 2011/0249921 | A1* | 10/2011 | Huang | F16C 29/048 |
| | | | | 384/18 |
| 2013/0336602 | A1* | 12/2013 | Jahrling | F16C 29/005 |
| | | | | 384/49 |
| 2018/0320738 | A1* | 11/2018 | Xu | F16C 29/04 |

FOREIGN PATENT DOCUMENTS

| | | | | |
|---|---|---|---|---|
| CN | 106917936 A | * | 7/2017 | |
| KR | 10-2010-0079712 A | | 7/2010 | |
| KR | 20-2010-0007083 U | | 7/2010 | |
| KR | 20100007083 U | * | 7/2010 | ............ A47B 88/40 |
| KR | 20100127442 A | * | 12/2010 | |
| KR | 10-1114486 B1 | | 2/2012 | |
| KR | 10-1398127 B1 | | 5/2014 | |
| KR | 10-1454918 B1 | | 11/2014 | |
| KR | 20160055031 A | * | 5/2016 | |
| KR | 10-2016-0122661 A | | 10/2016 | |
| KR | 20160122661 A | * | 10/2016 | ........... A47B 88/443 |
| WO | WO 2008/038472 A1 | | 4/2008 | |
| WO | WO-2014200125 A1 | * | 12/2014 | ............ B29C 45/26 |
| WO | WO-2016167576 A1 | * | 10/2016 | ........... A47B 88/493 |

* cited by examiner

Fig. 11A  Fig. 11B  Fig. 11C  Fig. 11D
90°       100°      140°      180°
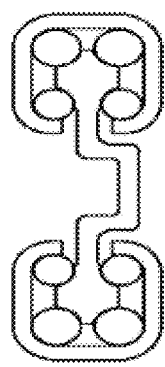 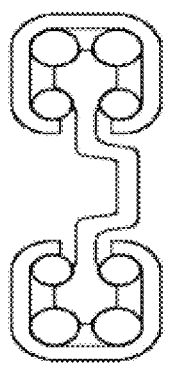 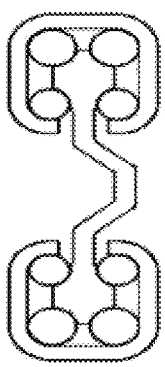 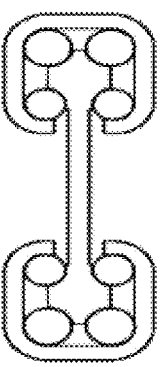
Fig. 11E
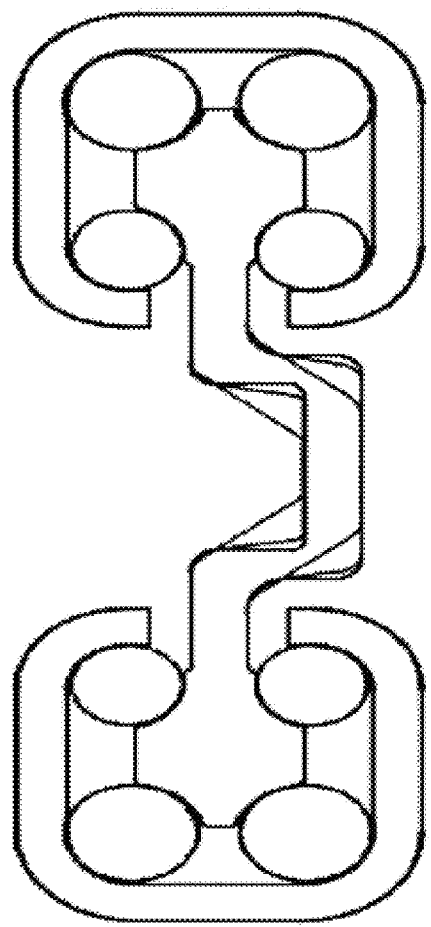

Fig. 12A | Fig. 12B | Fig. 12C | Fig. 12D
Rib angle 90 | Rib angle 100 | Rib angle 140 | Rib angle 180
Present invention
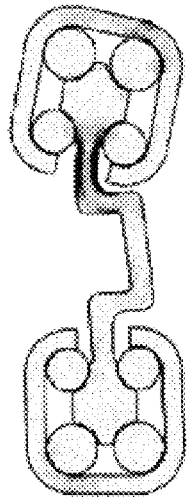 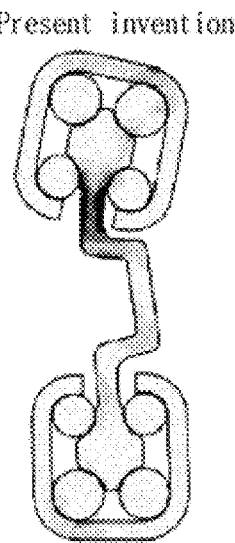 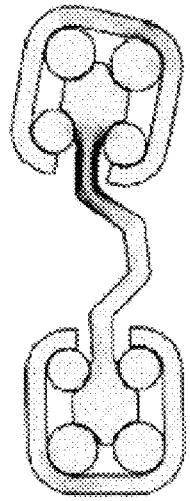 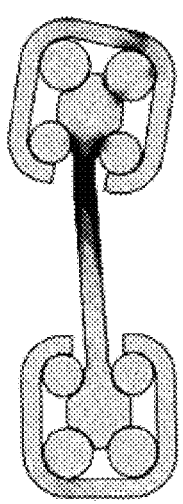
Stress:
1914.3MPa
Torsion angle
:12.12
Stress:
1545.6MPa
Torsion angle
:11.93
Stress:
1784.5MPa
Torsion angle
:12.34
Stress:
1936.45MPa
Torsion angle
:13.12

Ball center  Ball center  Outer side
Outer side  surface
surface

Ball center

Stress:
1848.2MPa
Torsion angle
:12.25

Ball center
Outer side surface

Present invention

Stress:
1545.6MPa
Torsion angle
:11.93

Outer side surface

Stress:
1916.2MPa
Torsion angle
:11.95

Two steps

Stress:
2249.1MPa
Torsion angle
:12.06

Three steps

Present invention

Stress:
1545.6MPa
Torsion angle
:11.93

0.7      0.8      0.9

0.7    0.8    0.9

Present invention

Stress:
1872.6MPa
Torsion angle
:11.9

Stress:
1545.6MPa
Torsion angle
:11.93

Stress:
1870.3MPa
Torsion angle
:12.54

SLIDE UNIT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/014528 filed on Nov. 23, 2018 which claims priority to the benefit of Korean Patent Application No. 10-2017-0160144 filed in the Korean Intellectual Property Office on Nov. 28, 2017, the entire contents of which are incorporated herein by reference.

TECHNICAL FIELD

The present invention relates generally to a slide unit. More particularly, the present invention relates to a slide unit, in which the structure of an inner rail and a slide ball is improved to minimize a torsion angle of the inner rail and stress concentration on the inner rail, and the inner rail is configured to be manufactured through a simple multilayer rolling process to improve productivity.

BACKGROUND ART

In general, a drawer guide rail member is provided between a main body and a drawer so that when a user opens and closes the drawer, the drawer is easily pulled out from and pushed into the main body. The drawer guide rail members are, for example, a two-stage folding type and a three-stage folding type. In the case of the three-fold folding type, a main body-side fixed rail is fixed to an inner wall surface of a refrigerator or general furniture, and a drawer-side movable rail is fixed to a drawer body (drawer).

Further, the drawer guide rail member is configured such that a middle slide rail is disposed between the main body-side fixed rail and the drawer-side movable rail, and a plurality of slide balls is disposed between the main body-side fixed rail and the middle slide rail, and between the drawer-side fixed rail and the middle slide rail.

However, the conventional middle slide rail is problematic in that it is formed in a flat plate shape and the stress is concentrated on the middle slide rail according to pulling and pushing the drawer, so the middle slide rail is damaged or deformed.

Further, conventionally, since the middle slide rail is formed by a complicated roll forming process, there is a problem that the manufacturing cost is increased and the productivity is decreased. In addition, there is a possibility of corrosion due to the inability to perform plating on the side surface portion, and thus the durability is deteriorated.

SUMMARY

Accordingly, the present invention has been made keeping in mind the above problems occurring in the related art, and an object of the present invention is to provide a slide unit, in which the torsion angle and stress concentration on an inner rail are minimized.

In order to achieve the above object, the present invention provides a slide unit including:
a fixed rail 100 fixed to a main body 10, and provided with a first accommodation space 110 at an inner side thereof; a movable rail 200 connected to a drawer body 20 to allow the drawer body 20 to be pulled out from and pushed into the main body 10, provided with a second accommodation space 210 at an inner side thereof, and configured to be movable with respect to the fixed rail 100; an inner rail 300 configured such that a first end thereof is inserted in the first accommodation space 110 and a second end thereof is inserted in the second accommodation space 210, so as to allow the movable rail 200 to be slidable with respect to the fixed rail 100; and a plurality of slide balls 400 inserted in the first accommodation space 110 to be disposed between the fixed rail 100 and the inner rail 300, and inserted in the second accommodation space 210 to be disposed between the movable rail 200 and the inner rail 300.

The plurality of slide balls 400 may include first slide balls 410 and second slide balls 420 with different diameters, and a diameter of each of the first slide balls 410 may be larger than a diameter of each of the second slide balls 420.

The inner rail 300 may include: insertion parts 310 inserted into the first accommodation space 110 and the second accommodation space, respectively; and a connection part 320 connecting the insertion parts 310 together, and being bent to protrude toward one side.

Each of the insertion parts 310 may include: a pair of first rolling surfaces 311 grooved inwardly at opposite sides of an end of the insertion part 310, with a pair of first slide balls 410 seated thereon; a pair of second rolling surfaces 312 grooved inwardly at positions spaced apart from the first rolling surfaces 311 at predetermined intervals toward the connection part 320, with a pair of second slide balls 420 seated thereon; and a reinforcing stepped surface 313 connecting the second rolling surfaces 312 and the connection part 320 together, and being configured such that a width thereof is gradually reduced in a direction from the second rolling surfaces 312 toward the connection part 320.

The connection part 320 may include: extending portions 321 extending from the insertion parts 310; bent portions 322 being bent from ends of the extending portions 321 and extending toward one side; and a center portion 323 connecting the bent portions 322 together.

An angle θ formed by each of the bent portions 322 and the center portion 323 may be greater than 90° and less than 180°.

The angle θ formed by each of the bent portions 322 and the center portion 323 may be greater than 90° and less than 140°.

The angle θ formed by each of the bent portions 322 and the center portion 323 may be 100°.

An outer side surface 323-1 of the center portion 323 may be positioned between a center line A connecting centers C2 of the second slide balls 420 together and an outer line B connecting outer side surfaces of the fixed rail 100 and the movable rail 200 together.

An inner side surface 323-2 of the center portion 323 may be positioned on a center line A connecting centers C2 of the second slide balls 420 together.

A maximum width T1 of the insertion part 310 may be larger than a minimum width T2 between the second rolling surfaces 312, and the minimum width T2 between the second rolling surfaces 312 may be larger than a width T3 of the extending portion 321.

A relationship between a horizontal distance A' between centers C1 of the first slide balls 410, and a vertical distance B' between the centers C1 of the first slide balls 410 and centers C2 of the second slide balls 420 may satisfy the following equation.

$$0.7 < \frac{A'}{B'} < 0.9$$

The relationship between the horizontal distance A' between the centers C1 of the first slide balls 410, and the vertical distance B' between the centers C1 of the first slide balls 410 and the centers C2 of the second slide balls 420 may satisfy the following equation.

$$\frac{A'}{B'} = 0.8$$

The movable rail 200 may support the drawer body 20 upward at a lower surface thereof.

The inner rail 300 may be formed by a multilayer rolling process.

The fixed rail 100 may further include an auxiliary frame 120 to fix the fixed rail 100 to the main body 10.

The center portion 323 may further include a plurality of through-holes 323-3 spaced apart from each other along a longitudinal direction thereof.

The inner rail 300 may further include a plurality of grooves 340 provided on each of the first rolling surfaces 311 and the second rolling surfaces 312, and arranged to be spaced apart from each other, wherein each of the plurality of grooves 340 is provided to extend along a longitudinal direction of the inner rail 300.

The inner rail 300 may further include a plurality of rolling protrusions 350 provided on each of the first rolling surfaces 311 and the second rolling surfaces 312, and arranged to be spaced apart from each other, wherein each of the plurality of rolling protrusions 350 is provided to extend along a longitudinal direction of the inner rail 300.

According to the present invention, since the torsion angle and stress concentration on the inner rail are minimized, it is possible to prevent the inner rail from being damaged and deformed.

Further, since the inner rail allowing the movable rail to slide relative to the fixed rail is formed by a multilayer rolling process, it is possible to lower manufacturing cost and to improve productivity through simplifying the manufacturing process.

Further, since the inner rail is formed by a multilayer rolling process, it is possible to uniformly coat the plating solution on the surface of the entire inner rail, thereby further preventing corrosion and increasing durability.

Further, since the plate of the inner rail is provided with a plurality of reinforcing ribs that extend along a longitudinal direction of the plate and are spaced apart from each other along a width direction of the plate, it is possible to prevent deformation caused by an external force, by reinforcing the strength of the inner rail.

Further, since the present invention includes at least one groove provided in each of the plurality of rolling surfaces spaced apart from each other, or includes at least one rolling protrusion provided in each of the plurality of rolling surfaces spaced apart from each other, it is possible to reduce the mutual rolling contact area between a plurality of slide balls and the inner rail, thereby not only allowing the movable rail to further smoothly slide relative to the inner rail, but also allowing the inner rail to smoothly slide relative to the fixed rail.

Further, since the slide balls allowing slide movement have different diameters, it is possible to improve rollability while improving the durability of the inner rail even when a heavy load is applied to the slide unit when the drawer body contains a heavy object.

BRIEF DESCRIPTION OF THE DRAWINGS

FIGS. 11A to 11E are schematic diagrams showing a modeling experiment 1 of the slide unit according to the present invention.

FIGS. 12A to 12D are views showing an experimental result of the modeling experiment 1 of the slide unit according to the present invention.

DETAILED DESCRIPTION

Figure 1:
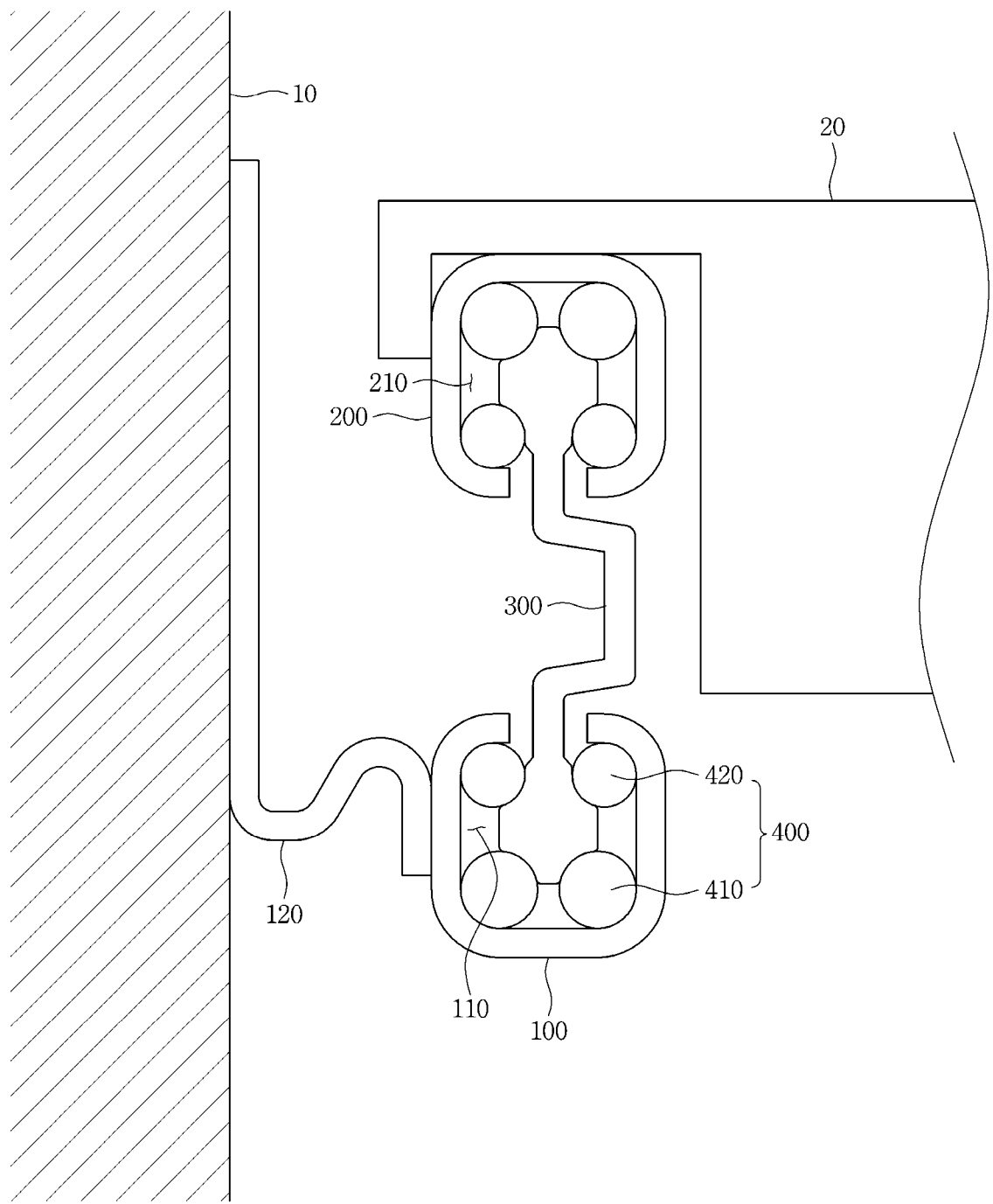
FIGS. 1 to 5 are views showing a state where a slide unit according to the present invention is installed.
Figure 2:
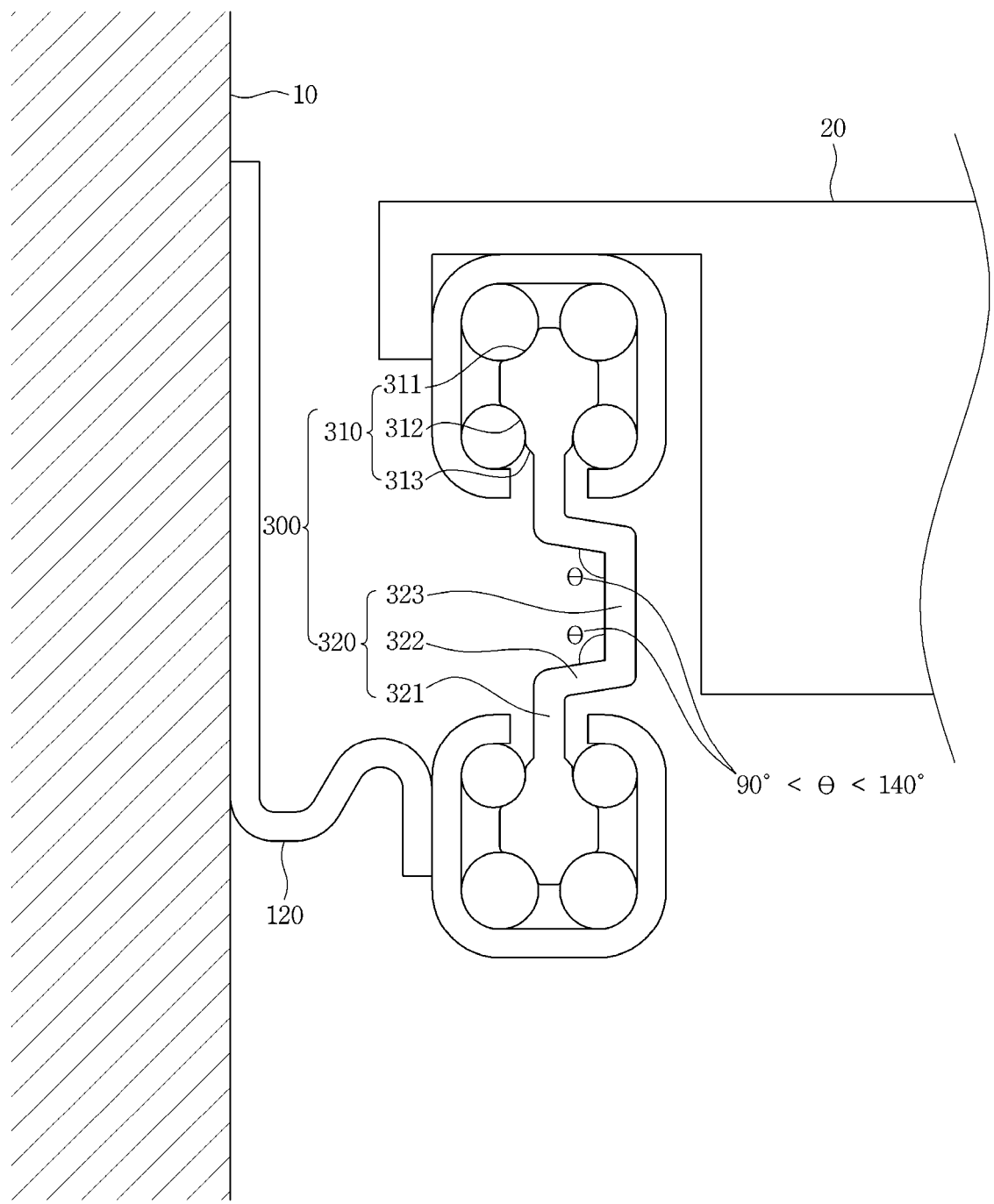
Figure 3:
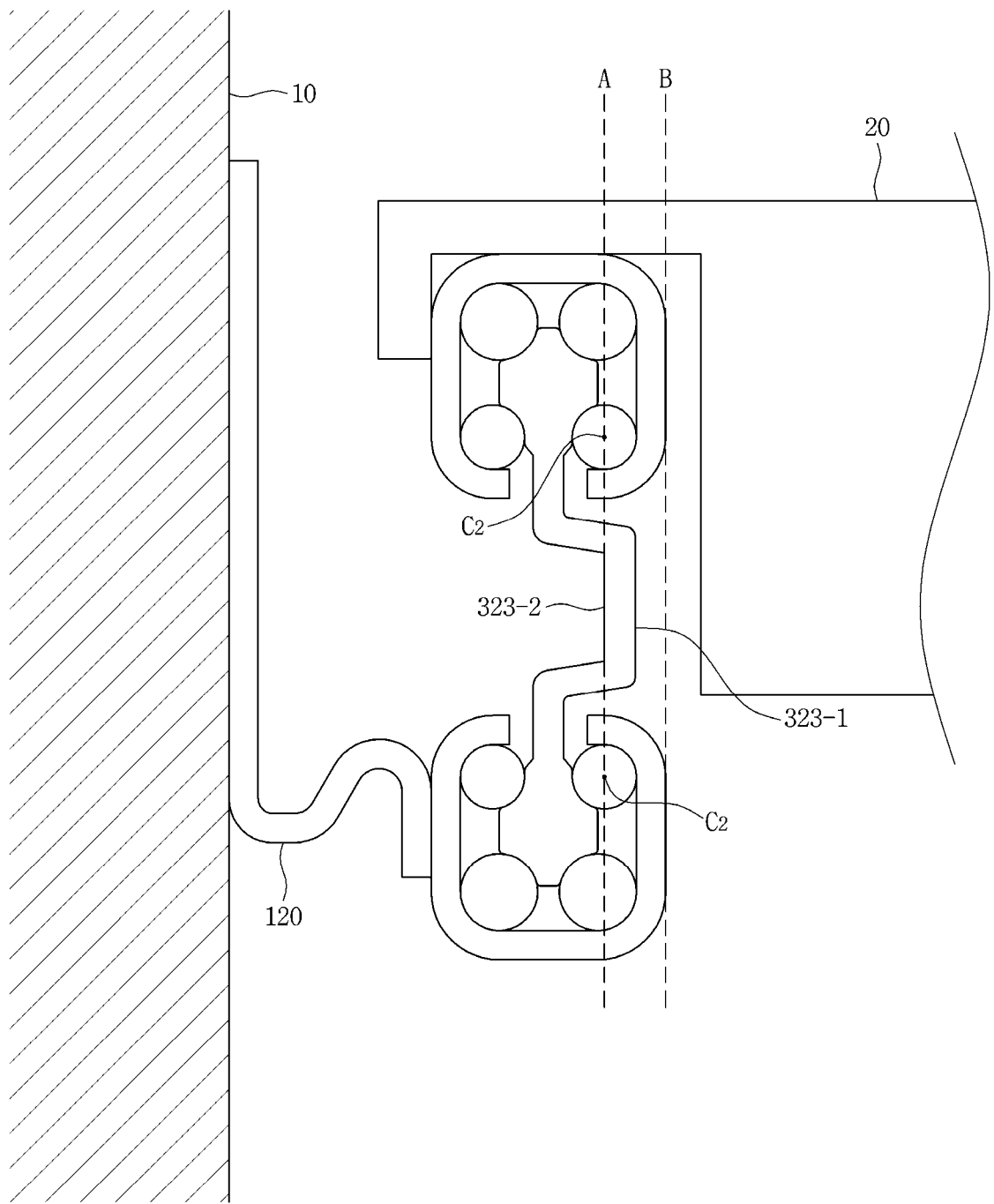
Figure 4:
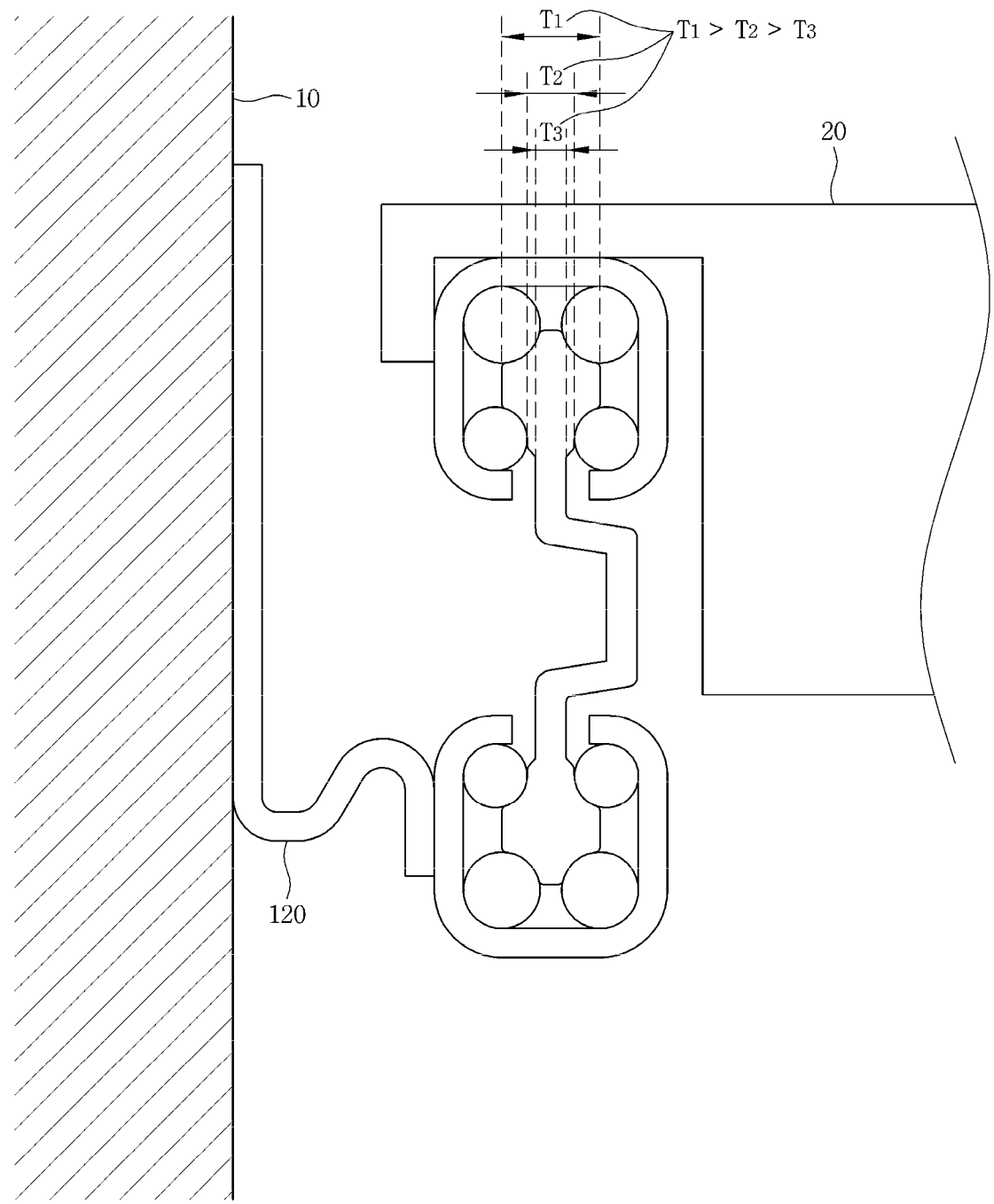
Figure 5:
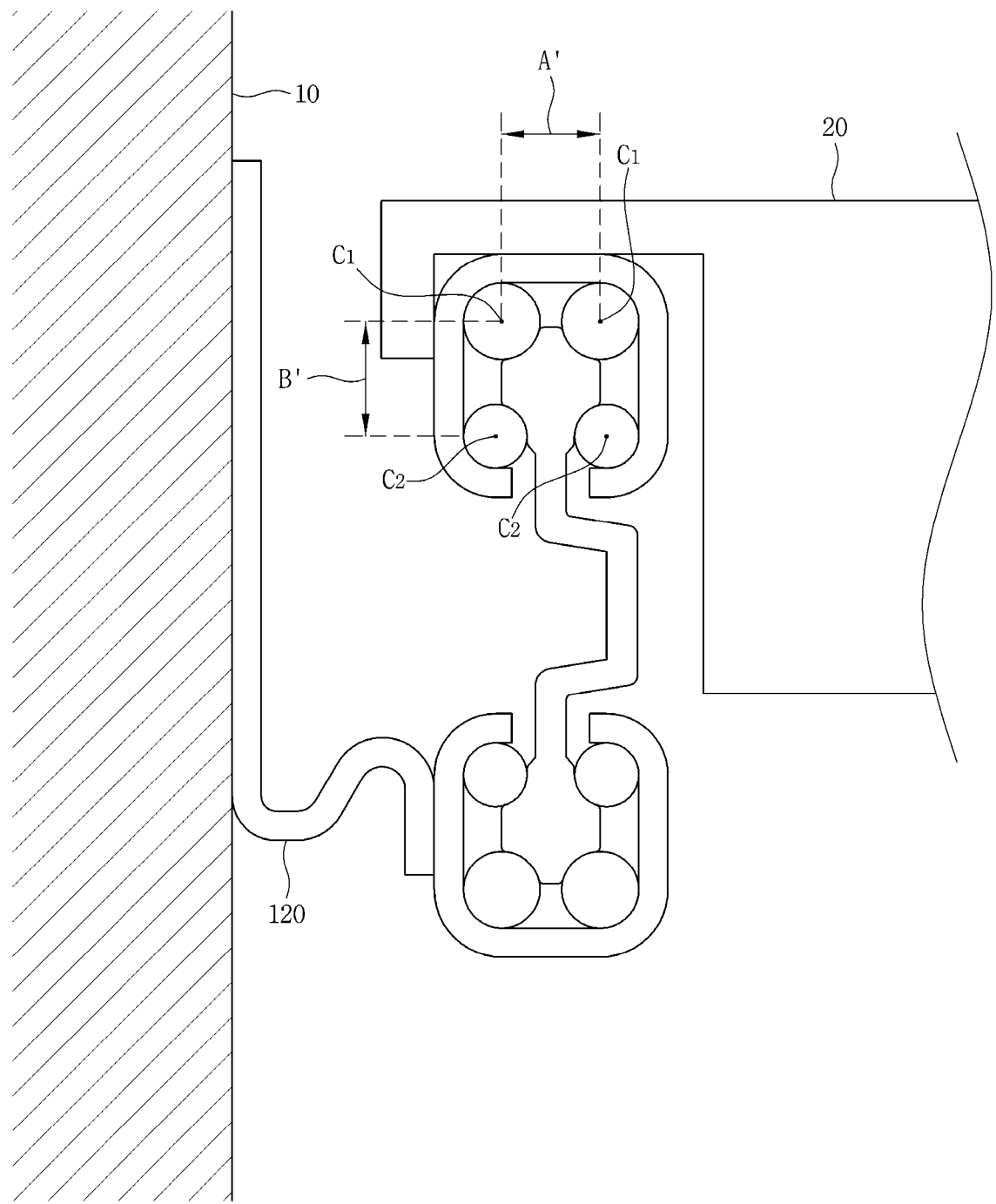

Hereinbelow, to aid in understanding the invention, preferred embodiments of the present invention will be described in detail with reference to the accompanying drawings. It should be understood that the embodiment of the present invention may be changed to a variety of embodiments and the scope and spirit of the present invention are not limited to the embodiment described hereinbelow.

The embodiment of the present invention described hereinbelow is provided for allowing those skilled in the art to more clearly comprehend the present invention. Therefore, it should be understood that the shape and size of the elements shown in the drawings may be exaggeratedly drawn to provide an easily understood description of the structure of the present invention. In the following description, it is to be noted that, when the functions of conventional elements and the detailed description of elements related with the present invention may make the gist of the present invention unclear, a detailed description of those elements will be omitted.

FIGS. 1 to 5 are views showing a state where a slide unit according to the present invention is installed. Referring to FIGS. 1 to 5, the slide unit according to the present invention includes a fixed rail 100, a movable rail 200, an inner rail 300, and slide balls 400.

The fixed rail 100 is fixed to a main body 10, and is provided with a first accommodation space 110 at an inner side thereof. The fixed rail 100 can be fixed to various parts such as an inner wall surface of a refrigerator or furniture by using screws or the like. Hereinafter, reference will be made to the case of being provided in a refrigerator, for convenience of explanation.

Specifically, as shown in FIG. 1, the fixed rail 100 may be formed in a roughly bent 'U' shape, and may be formed through a pressing process, but is not limited thereto.

Further, the fixed rail 100 may further include an auxiliary frame 120 to fix the fixed rail 100 to the main body 10. Here, the fixed rail 100 and the auxiliary frame 120 may be fixedly coupled to each other through spot welding, rivet joint, screw-coupling, or the like.

As described above, the fixed rail 100 may be directly fixed to the main body 10, or may be fixed to the main body 10 through the auxiliary frame 120. In the case where the fixed rail 100 is directly fixed to the main body 10, the number of components is reduced and no mutual bonding process is required, so the manufacturing cost is reduced and the productivity is improved. Further, in the case where the fixed rail 100 is fixed to the main body 10 through the auxiliary frame 120, a space between the main body 10 and the fixed rail 100 are secured, so the degree of freedom can be increased when the fixed rail 100 is placed.

The movable rail 200 is connected to a drawer body 20 to allow the drawer body 20 to be pulled out from and pushed into the main body 10, and is provided with a second accommodation space 210 at an inner side thereof.

Further, the movable rail 200 is movable relative to the fixed rail 100, so the drawer body 20 can be pulled out from and pushed into the main body 10. The movable rail 200 may be fixedly coupled directly to the drawer body 20, or may be fixedly coupled to the drawer body 20 by using a separate bracket (not shown), etc.

Further, the movable rail 200 may be configured to support the drawer body 20 upward at the lower surface thereof, but not limited thereto, the movable rail 200 may be configured to be fixed to a side surface or an upper surface of the drawer body 20.

The inner rail 300 is configured such that a first end thereof is inserted in the first accommodation space 110 and a second end thereof is inserted in the second accommodation space 210, so as to allow the movable rail 200 to be slidable with respect to the fixed rail 100.

The inner rail 300 is formed by a multilayer rolling process. The rolling means a method of processing a metal material having a high or room temperature using plasticity of the metal by passing the material through a rotating roller, and the multilayer rolling means a method of forming a plurality of thicknesses by a rolling process.

In other words, conventionally, a structure corresponding to the inner rail is formed by a roll forming process. Roll forming is a plastic working method in which a metal strip (coil) is successively passed through some sets of forming rollers arranged side by side, and is sequentially formed and folded into a desired sectional shape from a flat plate. To be more specific, one plate is roll-formed to form a surface contactable with a plurality of slide balls, and opposite sides thereof are bent such that a center portion thereof has two layers.

However, the above described conventional inner rail formed by a roll forming process is problematic in that since the opposite end portions disposed at the center do not completely contact each other, it is difficult for the plating solution to be injected into a fine clearance where the two layers contact each other. Accordingly, the possibility of corrosion is increased at the portion where the plating solution is not coated, and as time passes, the corroded portion is expanded to the entire area and the durability of the entire inner rail is dramatically deteriorated.

Unlike the conventional inner rail, in the present invention, the inner rail 300 is produced by a multilayer rolling process, and accordingly, a separate bending process that is conventionally required is no longer required, so it is possible to lower manufacturing cost and to improve productivity through simplifying the manufacturing process.

Further, the inner rail of the present invention is one structure formed by rolling unlike the conventional inner rail that has two layers at the center portion thereof. Thus, in the present invention, since there is no fine clearance where the two layers contact each other, it is possible to uniformly coat the surface of the inner rail 300 with the plating solution, thereby preventing corrosion and increasing durability.

A detailed structure of the inner rail 300 will be described later.

The slide balls 400 are inserted in the first accommodation space 110 to be disposed between the fixed rail 100 and the inner rail 300, and are inserted in the second accommodation space 210 to be disposed between the movable rail 200 and the inner rail 300.

The slide balls 400 reduce the frictional force between the fixed rail 100 and the inner rail 300, and also reduce the frictional force between the movable rail 200 and the inner rail 300, thereby facilitating the slidable movement of the movable rail 200 with respect to the fixed rail 100.

The slide balls 400 include first slide balls 410 and second slide balls 420 with different diameters. Here, the diameter of the first slide ball 410 may be larger than that of the second slide ball 420. Accordingly, by specifically limiting the positions of an outer side surface 323-1 and an inner side surface 323-2, a relationship among a maximum width T1 of an insertion part 310, a minimum width T2 of a second rolling surface 312, and a width T3 of an extending portion 321, and a ratio between a horizontal distance A' between the centers C1 of the first slide balls 410 and a vertical distance B' between the centers C1 of the first slide balls 410 and the centers C2 of the second slide balls 420, it is possible to obtain a shape that maximizes the torsional rigidity of the inner rail 300 and minimizes the stress concentration.

Figure 9:
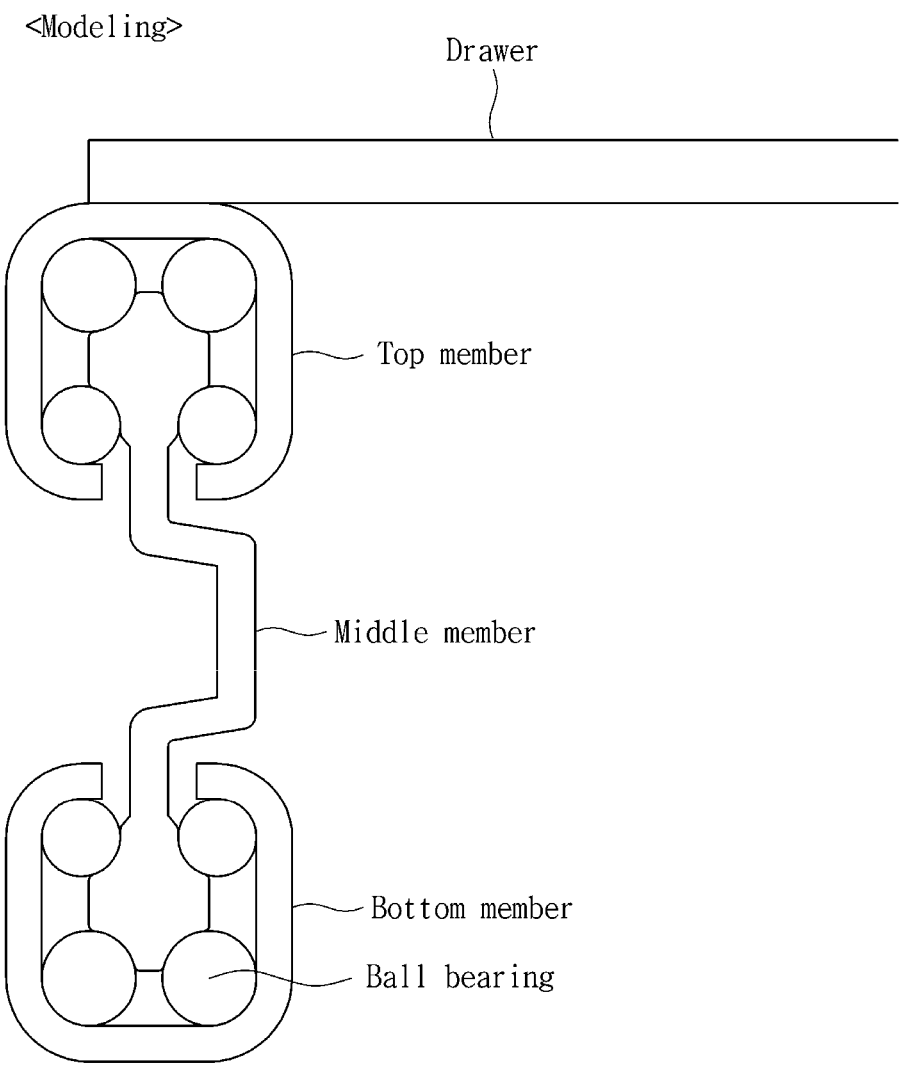
FIG. 9 is a schematic diagram showing a modeling experiment of the slide unit according to the present invention.
Figure 10:
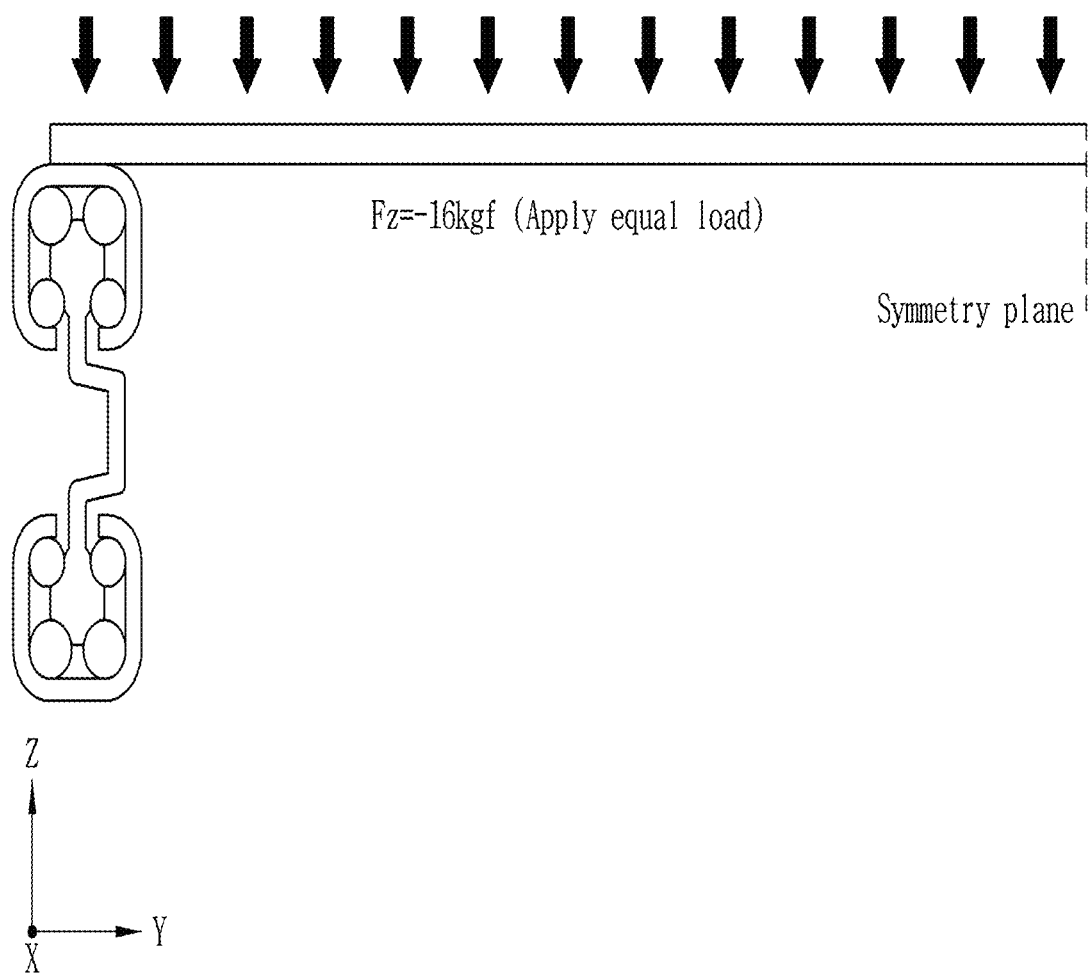
FIG. 10 is a view showing an analysis condition in the modeling experiment of the slide unit according to the present invention.
Figures 13A, 13B, 13C:
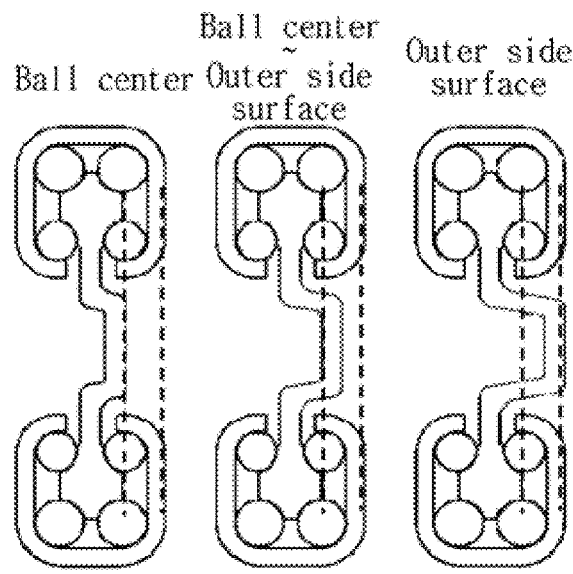
FIGS. 13A to 13D are schematic diagrams showing a modeling experiment 2 of the slide unit according to the present invention.
Figure 13D:
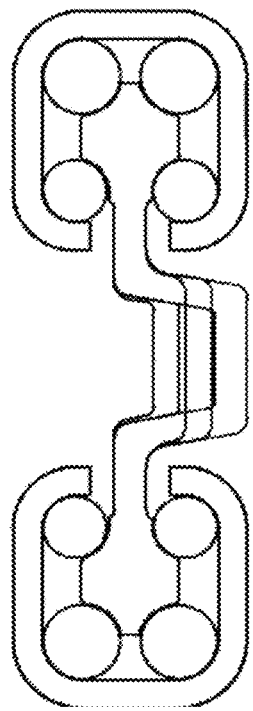

An optimal range was derived from the modeling experiment (see FIG. 9) for concrete limitations, and the experiment was conducted according to the material property (see Table 1) and analysis condition (see FIG. 10). The concrete limitations will be described later.

TABLE 1

| Material Property | Top member | Middle member | Bottom member | Ball bearing |
|---|---|---|---|---|
| Name | SCP 10 | SWRCH 10AB | SCP 10 | SUS 304 |
| Elastic modulus(N/mm$^2$) | 200,000 | 200,000 | 200,000 | 210,000 |

TABLE 1-continued

| Material Property | Top member | Middle member | Bottom member | Ball bearing |
|---|---|---|---|---|
| Yield stress(N/mm$^2$) | 272.6 | 428.9 | 272.6 | 313.0 |
| Tensile stress(N/mm$^2$) | 556.0 | 1509.4 | 556.0 | 1223.5 |
| Elongation(–) | 0.249 | 0.367 | 0.249 | 0.520 |
| Test method | Tensile test | Compression test | Tensile test | Compression test |

Hereinafter, reference will be made to the detailed structure of the inner rail 300. (see FIG. 2)

The inner rail 300 includes insertion parts 310 and a connection part 320, wherein the insertion parts 310 are inserted into the first accommodation space 110 and the second accommodation space, respectively.

Further, the connection part 320 is bent to protrude toward one side while connecting the insertion parts 310.

Here, each of the insertion parts 310 includes a pair of first rolling surfaces 311, a pair of second rolling surfaces 312, and a reinforcing stepped surface 313. The pair of first rolling surfaces 311 is grooved inwardly at opposite sides of an end of the insertion part 310, and the pair of first slide balls 410 is seated on the pair of first rolling surfaces 311.

Further, the pair of second rolling surfaces 312 is grooved inwardly at positions spaced apart from the first rolling surfaces 311 toward the connection part 320 at predetermined intervals, and the pair of second slide balls 420 is seated on the pair of second rolling surfaces 312.

The reinforcing stepped surface 313 connects the second rolling surfaces 312 and the connection part 320 together, and is configured such that a width thereof is gradually reduced in a direction from the second rolling surfaces 312 toward the connection part 320.

Further, the connection part 320 includes extending portions 321, bent portions 322, and a center portion 323, wherein the extending portions 321 extend from the insertion parts 310. Further, the bent portions 322 is bent from ends of the extending portions 321 and extend toward one side, and the center portion 323 connect the bent portions 322 together.

Here, an angle θ formed by the bent portion 322 and the center portion 323 is greater than 90° and less than 180°. More preferably, the angle θ formed by the bent portion 322 and the center portion 323 is greater than 90° and less than 140°. In particular, it may be most preferred that the angle θ formed by the bent portion 322 and the center portion 323 is 100°.

In other words, when the angle θ is greater than 90° and less than 180°, the stress concentration can be significantly reduced and the torsion angle is also minimized (that is, the torsional rigidity is maximized) compared to the case where the angle θ is 90° or less or is 180° or more.

Further, when the angle θ is greater than 90° and less than 140°, the stress concentration can be significantly reduced and the torsion angle is also minimized (that is, the torsional rigidity is maximized) compared to the case where the angle θ is 90° or less or is 140° or more.

In order to derive such a numerical range, a modeling experiment 1 was conducted (see FIGS. 9 and 11A-11E), and the experiment was conducted according to the material property (see Table 1) and analysis condition (see FIG. 10) in the modeling experiment 1.

The experimental result shows that: i) when the angle θ is 90°, the stress is 1914.3 MPa and the torsion angle is 12.12°; and ii) when the angle θ is 100°, the stress is 1545.6 MPa and the torsion angle is 11.93°. Further, iii) when the angle θ is 140°, the stress is 1784.5 MPa and the torsion angle is 12.34°; and iv) when the angle θ is 180°, the stress is 1936.45 MPa and the torsion angle is 13.12°. (see FIGS. 12A to 12D)

As a result of the above experiment, it was confirmed that when the angle θ is greater than 90° and less than 180°, the stress concentration can be remarkably reduced and the torsion angle is also reduced (that is, the torsional rigidity is increased). More preferably, it was confirmed that when the angle θ is greater than 90° and less than 140°, the stress concentration can be further remarkably reduced and the torsion angle is also further reduced (that is, the torsional rigidity is increased).

In particular, it was confirmed that when the angle θ formed by the bent portion 322 and the center portion 323 is 100°, the stress concentration is minimized and the torsion angle is also minimized (that is, the torsional rigidity is maximized).

Further, the outer side surface 323-1 of the center portion 323 may be positioned between a center line A connecting the centers C2 of the second slide balls 420 together and an outer line B connecting outer side surfaces of the fixed rail 100 and the movable rail 200 together. Further, the inner side surface 323-2 of the center portion 323 may be positioned on the center line A connecting the centers C2 of the second slide balls 420.

In order to derive the optimal positions of the outer side surface 323-1 and the inner side surface 323-2, a modeling experiment 2 was conducted (see FIGS. 9 and 13A-13D), and the material property (see Table 1) and analysis condition (see FIG. 10) in the modeling experiment 2 are the same as in the modeling experiment 1.

Figure 14A:
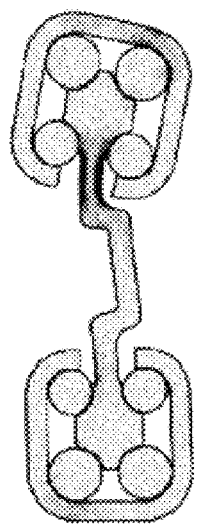
FIGS. 14A to 14C are views showing an experimental result of the modeling experiment 2 of the slide unit according to the present invention.
Figure 14B:
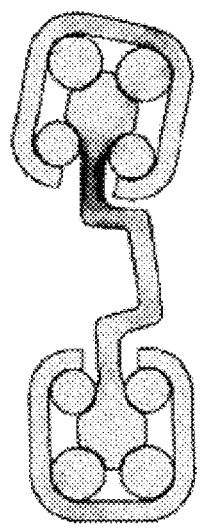
Figure 14C:
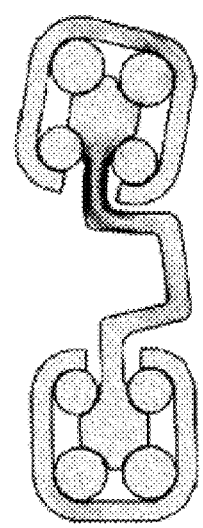
Figure 15A:
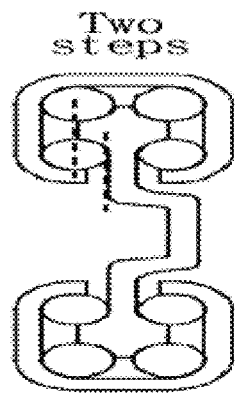
FIGS. 15A to 15C are schematic diagrams showing a modeling experiment 3 of the slide unit according to the present invention.
Figure 15B:
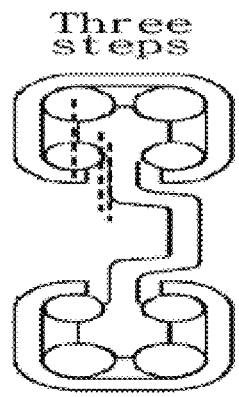
Figure 15C:
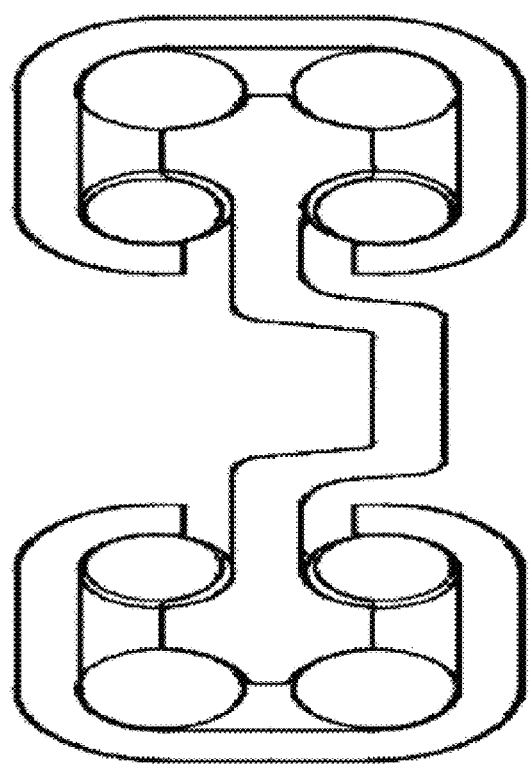

The experimental result shows that: i) when the outer side surface 323-1 of the center portion 323 is positioned on the center line A connecting the centers C2 of the second slide balls 420, the stress is 1848.2 MPa and the torsion angle is 12.25°; ii) when the outer side surface 323-1 of the center portion 323 is positioned between the center line A connecting the centers C2 of the second slide balls 420 together and the outer line B connecting outer side surfaces of the fixed rail 100 and the movable rail 200 together, the stress is 1545.6 MPa and the torsion angle is 11.93°; and iii) when the outer side surface 323-1 of the center portion 323 is positioned outside the outer line B connecting outer side surfaces of the fixed rail 100 and the movable rail 200 together, the stress is 1916.2 MPa and the torsion angle is 11.95°. (see FIGS. 14A to 14C)

As a result of the above experiment, it was confirmed that when the outer side surface 323-1 of the center portion 323 is positioned between the center line A connecting the centers C2 of the second slide balls 420 together and the outer line B connecting outer side surfaces of the fixed rail 100 and the movable rail 200 together, the stress concentration can be remarkably reduced and the torsion angle can be also minimized (that is, the torsional rigidity is maximized).

Further, the maximum width T1 of the insertion part 310 may be configured to be larger than the minimum width T2 between the second rolling surfaces 312, and the minimum width T2 between the second rolling surfaces 312 may be configured to be larger than the width T3 of the extending portion 321.

In order to derive the optimal relationship among the maximum width T1 of the insertion part 310, the minimum width T2 between the second rolling surfaces 312, and the width T3 of the extending portion 321, a modeling experiment 3 was conducted (see FIGS. 9 and 15A-15C).

The material property (see Table 1) and analysis condition (see FIG. 10) in the modeling experiment 3 are the same as in the modeling experiment 1.

Figure 16A:
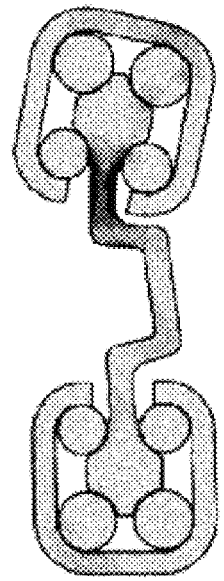
FIGS. 16A and 16B are showing an experimental result of the modeling experiment 3 of the slide unit according to the present invention.
Figure 16B:
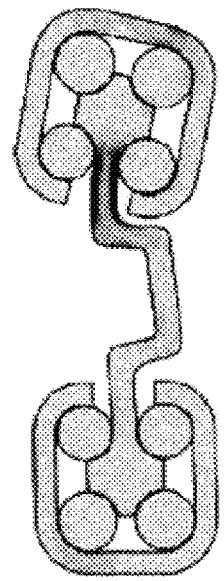
Figures 17A, 17B, 17C:
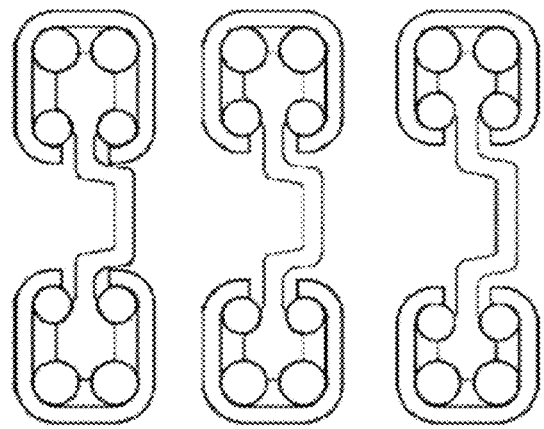
FIGS. 17A to 17D are schematic diagrams showing a modeling experiment 4 of the slide unit according to the present invention.
Figure 17D:
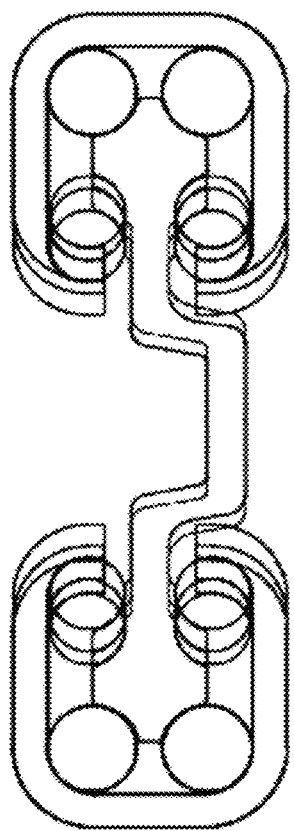

The experimental result shows that: i) when the insertion part 310 is formed to have two steps by equally setting the minimum width T2 between the second rolling surfaces 312 and the width T3 of the extending portion 321, the stress applied to the inner rail 300 is 2249.1 MPa and the torsion angle of the inner rail 300 is 12.06°; and ii) when the insertion part 310 is formed to have three steps by setting the maximum width T1 of the insertion part 310 to be larger than the minimum width T2 between the second rolling surfaces 312 and setting the minimum width T2 between the second rolling surfaces 312 to be larger than the width T3 of the extending portion 321, the stress applied to the inner rail 300 is 1545.6 MPa and the torsion angle of the inner rail 300 is 11.93°. (see FIGS. 16A and 16B)

As a result of the above experiment, it was confirmed that when the maximum width T1 of the insertion part 310 is configured to be larger than the minimum width T2 between the second rolling surfaces 312, and the minimum width T2 between the second rolling surfaces 312 is configured to be larger than the width T3 of the extending portion 321, the stress concentration can be remarkably reduced and the torsion angle can be also minimized (that is, the torsional rigidity is maximized).

Further, a relationship between a horizontal distance A' between the centers C1 of the first slide balls 410, and a vertical distance B' between the centers C1 of the first slide balls 410 and the centers C2 of the second slide balls 420 may satisfy Equation 1 below. In particular, the relationship between the horizontal distance A' between the centers C1 of the first slide balls 410, and the vertical distance B' between the centers C1 of the first slide balls 410 and the centers C2 of the second slide balls 420 may satisfy Equation 2 below.

$$0.7 < \frac{A'}{B'} < 0.9 \quad \text{[Equation 1]}$$

$$\frac{A'}{B'} = 0.8 \quad \text{[Equation 2]}$$

In order to derive the optimal ratio between the horizontal distance A' between the centers C1 of the first slide balls 410, and the vertical distance B' between the centers C1 of the first slide balls 410 and the centers C2 of the second slide balls 420, a modeling experiment 4 was conducted (see FIGS. 9 and 17A-17D), and the material property (see Table 1) and analysis condition (see FIG. 10) in the modeling experiment 4 are the same as in the modeling experiment 1.

Figure 18A:
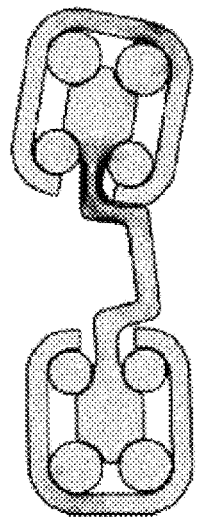
FIGS. 18A to 18C are showing an experimental result of the modeling experiment 4 of the slide unit according to the present invention.
Figure 18B:
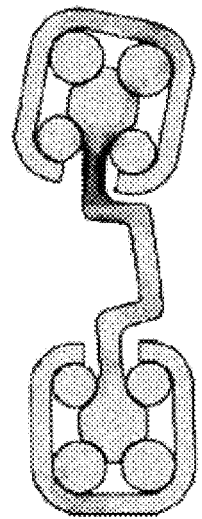
Figure 18C:
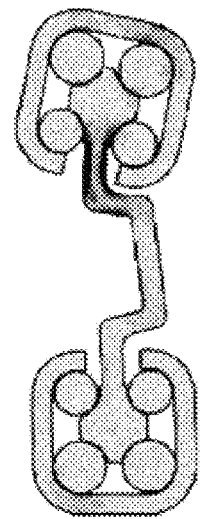

The experimental result shows that: i) when the ratio between the horizontal distance A' between the centers C1 of the first slide balls 410, and the vertical distance B' between the centers C1 of the first slide balls 410 and the centers C2 of the second slide balls 420 is 07:1, the stress applied to the inner rail 300 is 1872.6 MPa, and the torsion angle of the inner rail 300 is 11.61°; ii) when the ratio between the horizontal distance A' between the centers C1 of the first slide balls 410, and the vertical distance 13' between the centers C1 of the first slide balls 410 and the centers C2 of the second slide balls 420 is 08:1, the stress applied to the inner rail 300 is 1545.6 MPa, and the torsion angle of the inner rail 300 is 11.93°; and iii) when the ratio between the horizontal distance A' between the centers C1 of the first slide balls 410, and the vertical distance 13' between the centers C1 of the first slide balls 410 and the centers C2 of the second slide balls 420 is 09:1, the stress applied to the inner rail 300 is 1870.3 MPa, and the torsion angle of the inner rail 300 is 11.37°. (see FIGS. 18A to 18C)

As a result of the above experiment, it was confirmed that although the torsion angle under each condition was not significantly different, when the ratio between the horizontal distance A' between the centers C1 of the first slide balls 410, and the vertical distance B' between the centers C1 of the first slide balls 410 and the centers C2 of the second slide balls 420 is 08:1, the stress concentration can be remarkably reduced.

Figure 6:
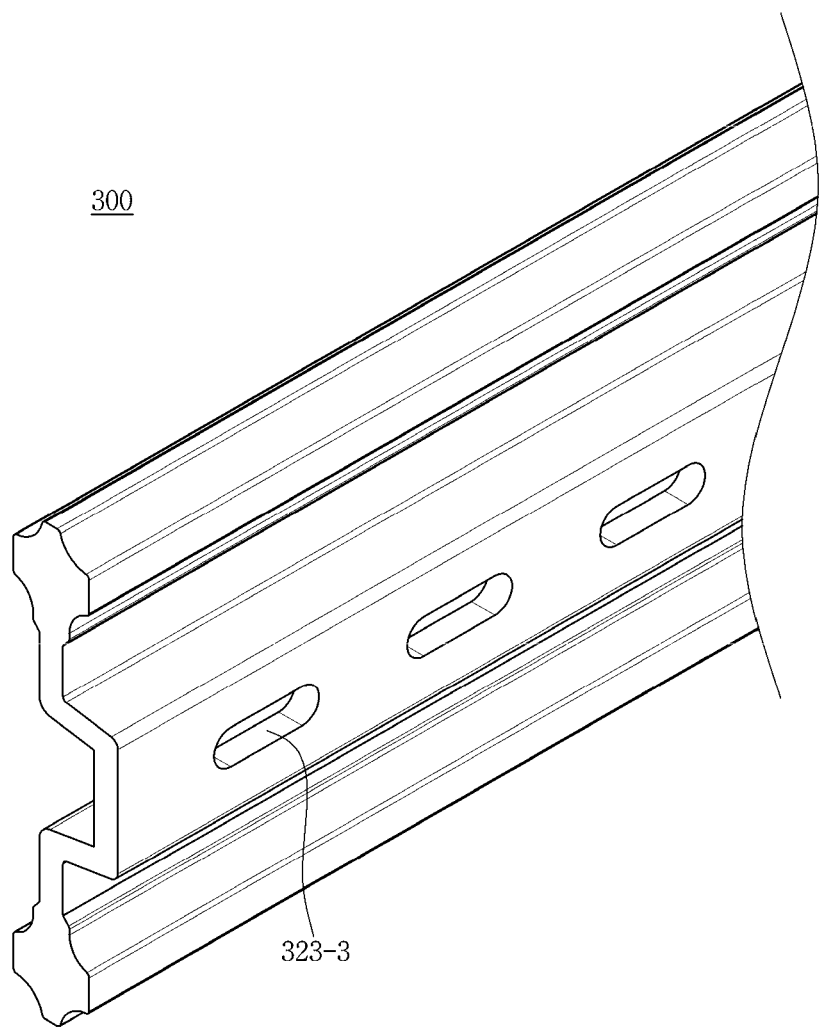
FIG. 6 is a view showing through-holes 323-3 of the slide unit according to the present invention.

FIG. 6 is a view showing through-holes 323-3 of the slide unit according to the present invention. Referring to FIG. 6, the center portion 323 of the slide unit according to the present invention further includes a plurality of through-holes 323-3 spaced apart from each other along a longitudinal direction, so it is possible to reduce the cost of raw materials while maintaining the rigidity of the inner rail 300.

Figure 7:
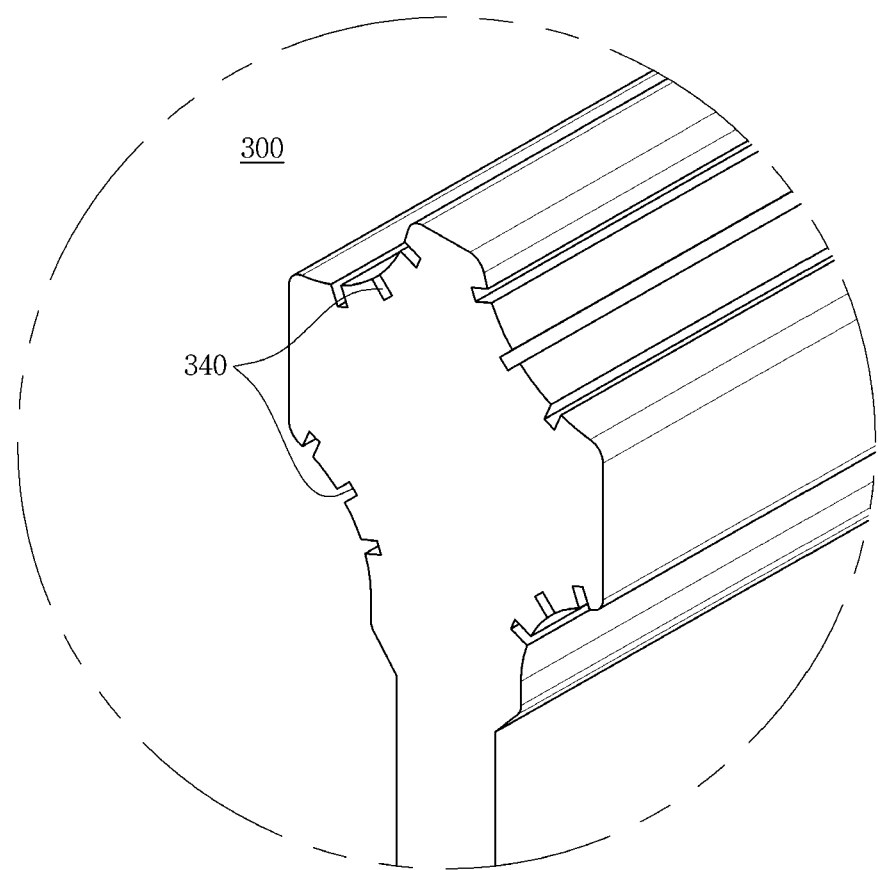
FIG. 7 is a view showing grooves 340 of the slide unit according to the present invention.

FIG. 7 is a view showing grooves 340 of the slide unit according to the present invention. Referring to FIG. 7, the slide unit according to the present invention includes a plurality of grooves 340 provided on each of the first rolling surfaces 311 and the second rolling surfaces 312, and arranged to be spaced apart from each other.

The grooves 340 are provided to extend along a longitudinal direction of the inner rail 300. Here, when the inner rail 300 is formed by rolling, the plurality of grooves 340 may be integrally formed. Further, the plurality of grooves 340 may be formed through a separate grooving process.

By providing the plurality of grooves 340 on the first rolling surfaces 311 and the second rolling surfaces 312, it is possible to reduce the mutual contact area between the first rolling surfaces 311 and the second rolling surfaces 312 with the plurality of slide balls 400 compared to the case where the grooves 340 are not provided. In other words, based on the cross section, the mutual contact area between the first rolling surfaces 311 and the second rolling surfaces 312 with the plurality of slide balls 400 can be reduced by the widths of the grooves 340. Accordingly, the present invention reduces a contact friction force between the plurality of slide balls 400, the first rolling surfaces 311, and the second rolling surfaces 312 occurring when the movable rail 200 slides relative to the inner rail 300 and the inner rail 300 slides relative to the fixed rail 100, thereby allowing the movable rail 200 to further smoothly slide.

Figure 8:
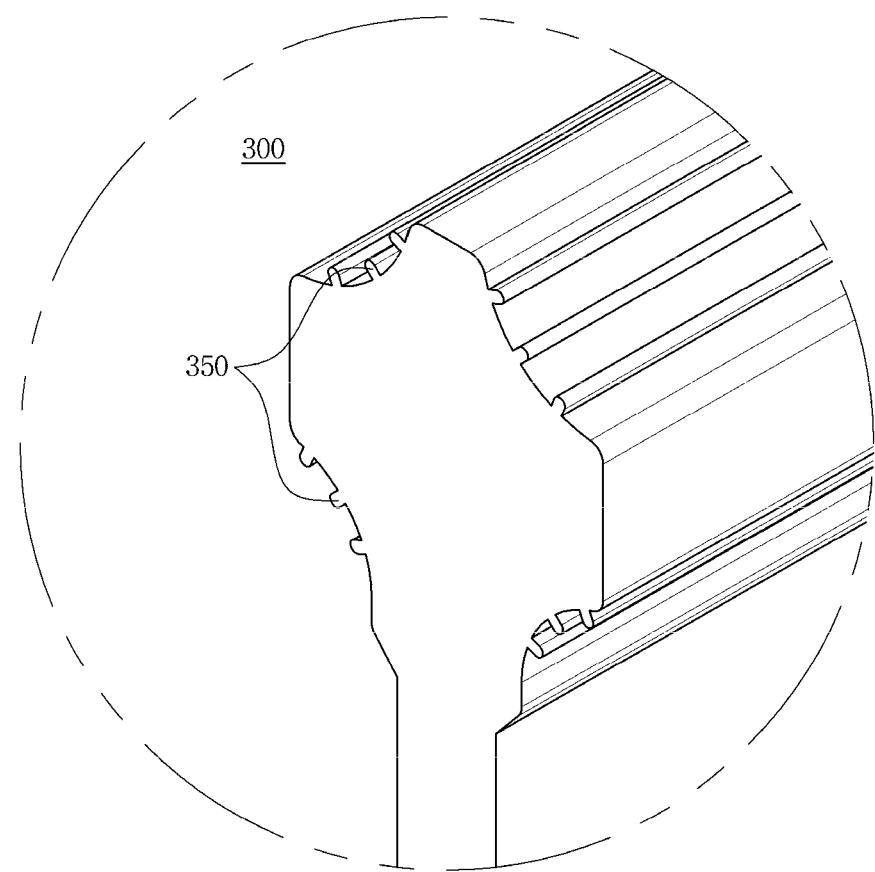
FIG. 8 is a view showing rolling protrusions 350 of the slide unit according to the present invention.

FIG. 8 is a view showing rolling protrusions 350 of the slide unit according to the present invention. Referring to FIG. 8, the slide unit according to the present invention includes a plurality of rolling protrusions 350 provided on each of the first rolling surfaces 311 and the second rolling surfaces 312, and arranged to be spaced apart from each other.

The rolling protrusions 350 are provided to extend along the longitudinal direction of the inner rail 300. Here, when the inner rail 300 is formed by rolling, the plurality of rolling protrusions 350 may be simultaneously formed. Further, the plurality of rolling protrusions 350 may be provided on the first rolling surfaces 311 and the second rolling surfaces 312 by welding after being separately formed.

By providing the plurality of rolling protrusions 350 on the first rolling surfaces 311 and the second rolling surfaces 312, it is possible to reduce the mutual contact area between the first rolling surfaces 311 and the second rolling surfaces 312 with the plurality of slide balls 400 compared to the case where the rolling protrusions 350 are not provided. In other words, based on the cross section, the mutual contact area between the first rolling surfaces 311 and the second rolling surfaces 312 with the plurality of slide balls 400 can be reduced by the widths of the rolling protrusions 350. Accordingly, the present invention reduces a contact friction force between the plurality of slide balls 400, the first rolling surfaces 311, and the second rolling surfaces 312 occurring when the movable rail 200 slides relative to the inner rail 300 and the inner rail 300 slides relative to the fixed rail 100, thereby allowing the movable rail 200 to further smoothly slide.

As described above, although reference to the embodiments of the slide unit for a drawer has allowed the present invention to be described in more detail, it should be understood that the present invention is not limited to the embodiments but may be variously changed without departing from the technical idea of the present invention. Therefore, the embodiments disclosed in the present invention are not restrictive but are illustrative, and the scope of the technical idea of the present invention is not limited to the embodiments. Accordingly, the scope of the present invention should be interpreted by the accompanying claims. Further, it is to be understood that various alternatives, modifications, and equivalents fall within the spirit and scope of the present invention as defined by the appended claims.

The present invention relates to a slide unit including a fixed rail, a movable rail, an inner rail, and slide balls in order to solve a problem that damage occurs by the stress concentration due to a shape (flat plate shape) of the conventional slide rail. According to the present invention, the stress concentration applied to the inner rail is minimized, so it is possible to prevent the inner rail from being damaged and deformed. Therefore, the present invention is industrially applicable.

The invention claimed is:

1. A slide unit comprising:
a fixed rail fixed to a main body and provided with a first accommodation space at an inner side thereof;
a movable rail connected to a drawer body to allow the drawer body to be pulled out from and pushed into the main body, provided with a second accommodation space at an inner side thereof, and configured to be movable with respect to the fixed rail;
an inner rail configured such that a first end thereof is inserted in the first accommodation space and a second end thereof is inserted in the second accommodation space, so as to allow the movable rail to be slidable with respect to the fixed rail; and
a plurality of slide balls inserted in the first accommodation space to be disposed between the fixed rail and the inner rail, and inserted in the second accommodation space to be disposed between the movable rail and the inner rail;
wherein the plurality of slide balls includes first slide balls and second slide balls with different diameters;
a diameter of each of the first slide balls is larger than a diameter of each of the second slide balls; and
a relationship between a horizontal distance (A') between centers of the first slide balls, and a vertical distance (B') between the centers of the first slide balls and centers of the second slide balls satisfies a following equation:

$$0.7 < \frac{A'}{B'} < 0.9.$$

2. The slide unit of claim 1, wherein the inner rail includes:
insertion parts inserted into the first accommodation space and the second accommodation space, respectively; and
a connection part connecting the insertion parts together, and being bent to protrude toward one side.

3. The slide unit of claim 2, wherein each of the insertion parts includes:
a pair of first rolling surfaces grooved inwardly at opposite sides of an end of the insertion part, with a pair of first slide balls seated thereon;
a pair of second rolling surfaces grooved inwardly at positions spaced apart from the first rolling surfaces at predetermined intervals toward the connection part, with a pair of second slide balls seated thereon; and
a reinforcing stepped surface connecting the second rolling surfaces and the connection part together, and being configured such that a width thereof is gradually reduced in a direction from the second rolling surfaces toward the connection part.

4. The slide unit of claim 3, wherein the connection part includes:
extending portions extending from the insertion parts;
bent portions being bent from ends of the extending portions and extending toward one side; and
a center portion connecting the bent portions together.

5. The slide unit of claim 4, wherein an angle formed by each of the bent portions and the center portion is greater than 90° and less than 180°.

6. The slide unit of claim 5, wherein the angle formed by each of the bent portions and the center portion is greater than 90° and less than 140°.

7. The slide unit of claim 6, wherein the angle formed by each of the bent portions and the center portion is 100°.

8. The slide unit of claim 4, wherein an outer side surface of the center portion is positioned between a center line connecting centers of the second slide balls together and an outer line connecting outer side surfaces of the fixed rail and the movable rail together.

9. The slide unit of claim 4, wherein an inner side surface of the center portion is positioned on a center line connecting centers of the second slide balls together.

10. The slide unit of claim 4, wherein a maximum width of the insertion part is larger than a minimum width between the second rolling surfaces, and the minimum width between the second rolling surfaces is larger than a width of the extending portion.

11. The slide unit of claim 4, wherein the center portion further includes a plurality of through-holes spaced apart from each other along a longitudinal direction thereof.

12. The slide unit of claim 3, wherein the inner rail further includes a plurality of grooves provided on each of the first rolling surfaces and the second rolling surfaces, and arranged to be spaced apart from each other,
wherein each of the plurality of grooves is provided to extend along a longitudinal direction of the inner rail.

13. The slide unit of claim 3, wherein the inner rail further includes a plurality of rolling protrusions provided on each of the first rolling surfaces and the second rolling surfaces, and arranged to be spaced apart from each other,
   wherein each of the plurality of rolling protrusions is provided to extend along a longitudinal direction of the inner rail.

14. The slide unit of claim 1, wherein the relationship between the horizontal distance (A') between the centers of the first slide balls, and the vertical distance (B') between the centers of the first slide balls and the centers of the second slide balls satisfies a following equation.

$$\frac{A'}{B'} = 0.8.$$

15. The slide unit of claim 1, wherein the movable rail supports the drawer body upward at a lower surface thereof.

16. The slide unit of claim 1, wherein the inner rail is formed by a multilayer rolling process.

17. The slide unit of claim 1, wherein the fixed rail further includes an auxiliary frame to fix the fixed rail to the main body.

* * * * *